(12) United States Patent
Tota et al.

(10) Patent No.: US 6,539,488 B1
(45) Date of Patent: Mar. 25, 2003

(54) SYSTEM WITH A PLURALITY OF MEDIA ACCESS CONTROL CIRCUITS WITH A SHARED MEMORY FOR STORING DATA AND SYNCHRONIZING DATA FROM A CLOCK DOMAIN TO A HOST CLOCK DOMAIN

(75) Inventors: Matthew Tota, Clinton, NJ (US); Martin S. Dell, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/451,295

(22) Filed: Nov. 30, 1999

(51) Int. Cl.⁷ .............................. G06F 1/12; G06F 3/00
(52) U.S. Cl. ...................... 713/400; 713/600; 710/129; 710/52
(58) Field of Search .......................... 710/4, 5, 52, 129; 713/600, 400; 370/401

(56) References Cited

U.S. PATENT DOCUMENTS

| | | | | |
|---|---|---|---|---|
| 4,046,964 A | * | 9/1977 | Daugherty et al. | 370/244 |
| 5,062,124 A | * | 10/1991 | Hayashi et al. | 375/356 |
| 5,406,554 A | * | 4/1995 | Parry | 370/381 |
| 5,740,175 A | * | 4/1998 | Wakeman et al. | 370/422 |
| 5,875,466 A | * | 2/1999 | Wakerly | 711/138 |
| 5,978,844 A | * | 11/1999 | Tsuchiya et al. | 709/221 |
| 6,130,891 A | * | 10/2000 | Lam et al. | 370/401 |
| 6,145,016 A | * | 11/2000 | Lai et al. | 710/4 |
| 6,154,796 A | * | 11/2000 | Kuo et al. | 710/52 |
| 6,160,809 A | * | 12/2000 | Adiletta et al. | 370/392 |
| 6,161,160 A | * | 12/2000 | Niu et al. | 710/129 |
| 6,279,044 B1 | * | 8/2001 | Niu et al. | 710/5 |
| 6,345,310 B1 | * | 2/2002 | Allison et al. | 709/250 |
| 6,373,848 B1 | * | 4/2002 | Allison et al. | 370/401 |
| 6,393,021 B1 | * | 5/2002 | Chow et al. | 370/378 |
| 6,430,187 B1 | * | 8/2002 | Park | 370/397 |

FOREIGN PATENT DOCUMENTS

JP 408223221 A * 8/1996

* cited by examiner

Primary Examiner—Thomas Lee
Assistant Examiner—Chun Cao
(74) Attorney, Agent, or Firm—Cohen, Pontani, Lieberman & Pavane

(57) ABSTRACT

Integrated circuits are disclosed which implement multiple channel media access control devices for controlling network communications. The integrated circuits include multiple channel slices which output data for transmission through the network. Each of the channel data are input to a single data memory, which reduces the size of the integrated circuit. Since only one data memory is used to buffer data from multiple channels, the data are first retimed from individual media access control circuit clock domains to a common host clock domain and then scheduled for output to the host. By retiming the data, integrated circuit signal throughput is enhanced. Deeply embedded transmit and receive FIFOs are provided to receive the channel data and implement shared memory access.

11 Claims, 12 Drawing Sheets

SYSTEM WITH A PLURALITY OF MEDIA ACCESS CONTROL CIRCUITS WITH A SHARED MEMORY FOR STORING DATA AND SYNCHRONIZING DATA FROM A CLOCK DOMAIN TO A HOST CLOCK DOMAIN

BACKGROUND OF THE INVENTION

1. Field of the Invention

This invention relates generally to integrated circuit media access control devices. More specifically, the invention relates to integrated circuits that implement multichannel media access control circuits in a shared memory architecture.

2. Description of the Related Art

Governed by the Institute of Electrical and Electronics Engineers ("IEEE") standard 802.3xx, media access control ("MAC") devices and circuits have become ubiquitous in network topologies for performing access and error control. MAC devices are responsible in Ethernet networks and other types of local area networks ("LANs") for managing media access, delimiting frames, checking for frame errors, recognizing frame addresses, and direct communication with the network server(s). Available for ordering at the IEEE website, both the draft 802.3xx standards and the adopted 802.3xx standards provide the technical requirements for MAC devices concerning the manner in which they are to be implemented in LANs and in standard and fast Ethernet networks. The IEEE adopted and draft 802.3xx standards are expressly incorporated herein by reference.

On a LAN, the MAC address is a particular computer's unique hardware number. On an Ethernet LAN, this number is the same as the Ethernet address. When a computer is connected to the Internet, a correspondence table relates the computer's IP address to the computer's physical (MAC) address on the LAN. The MAC address is used by the MAC sublayer of the data-link control ("DLC") layer of the particular telecommunications protocol for the system. There is a different MAC sublayer for each physical device type. Needless to say, as the number of physical devices multiplies on the network, a corresponding number of MAC sublayers must be implemented and multiple data channels are therefore created.

Typically, current MAC circuit designs require two dedicated memory elements for each channel of a MAC device, one for the transmit side of the MAC and one for the receive side of the MAC. However, as the number of channels that are found on a MAC integrated circuit increases, the dedicated memory elements for each of the memory elements (usually a FIFO) in each channel of a multi-channel MAC device will lead to a large number of memory elements on the integrated circuit. This large number of memory elements deleteriously impacts the size and the performance of the integrated circuit in a number of ways, not the least of which is an increase in the access time to the internal RAM devices which generally slows down the overall speed of the integrated circuit, and the concomitant increase in the number of MAC sublayers which increases the physical size of the integrated circuit.

Moreover, a common mistake in application specific integrated circuit (ASIC) sizing is that there is a constant area used for every bit of storage. In reality, every memory element contains a certain amount of overhead that includes address decoding, input/output latching and other functionality for the ASIC. As the number of bits in a memory decreases, the percentage of a memory that consists of this overhead increases. Additionally, when a hard placed macro, such as a memory, is placed on a chip, a certain amount of space around the macro is needed for routing overhead. For every side of a macro on a chip, about 50 $\mu$m is needed for routing overhead. Thus, for every memory that is placed in a design, an area-penalty is incurred.

There accordingly exists a long-felt but unresolved need in the art for multichannel MAC devices that overcome these and other currently-experienced problems. Such improved devices should reduce the overall size of integrated circuits that implement the MACs, and should minimize the access time to internal RAM devices of the circuit.

SUMMARY OF THE INVENTION

The aforementioned problems are solved, and long-felt needs met, by integrated circuits provided in accordance with the present invention. The integrated circuits comprise a plurality of media access control circuits which are capable of receiving and transmitting multiple channels of data according to a clock domain timing sequence internal to each of the media access control circuits. A shared memory element is provided for receiving channel data from more than one of the multiple channels and for requesting that data be fetched from the channels. The memory element is deeply embedded in a FIFO which greatly aids in reducing the physical area of the integrated circuit. Preferably, a multi-channel controller is provided for controlling when the data can be stored in the memory element and scheduling the requests from each channel so that the data can be retimed from the clock domain to a host clock domain of the integrated circuit.

The integrated circuits of the present invention provide an improvement over the performance of heretofore-known multichannel MAC devices and greatly reduce the size of prior art integrated circuits that have implemented multi-channel MAC devices. By retiming channel data to a host clock domain in accordance with the present invention, channel management efficiency is enhanced over earlier multichannel MAC integrated circuits.

Additionally, the multichannel MAC devices of the present invention greatly reduce the overhead required to implement multi-memory devices. For example, assuming a 16 port MAC device wherein each MAC requires 256 bytes for receive and 256 bytes for transmit. Thus, each MAC would require two 32×36 RAMs for receive and two more for transmit. Assuming a 0.25 $\mu$m fabrication process with a routing overhead of 50 $\mu$m, the following table summarizes the area requirements for such a device:

|       | 32 × 36 RAM (sqmm) | Routing per RAM (sqmm) | Number of RAMs | Total Area (sqmm) |
|-------|--------------------|------------------------|----------------|-------------------|
| RX    | 0.168              | .092                   | 32             | 8.322             |
| TX    | 0.168              | .092                   | 32             | 8.322             |
| Total |                    |                        |                | 16.66             |

However, in accordance with the invention, eight ports could share one RAM macro; the total number of bits would not change, but the configuration would change. Eight channels together would require two 256×36 RAMs for receive and two more for transmit. The area requirements for this configuration are as follows:

| | 256 × 36 RAM (sqmm) | Routing per RAM (sqmm) | Number of RAMs | Total Area (sqmm) |
|---|---|---|---|---|
| RX | 0.603 | .166 | 4 | 3.075 |
| TX | 0.603 | .166 | 4 | 3.075 |
| Total | | | | 6.15 |

Thus, the total area drops from 16.66 square millimeters using discrete memories to 6.15 square millimeters using shared memories of the present invention; an area savings of 63%. Such results have not heretofore been achieved in the art.

The inventive integrated circuits also have superior performance characteristics compared to prior MAC devices. Typically, when calculating the speed of operation of a memory structure the placement of memory macros their effects on the capacitive load are mistakenly ignored. As macros are placed farther apart in a design, the capacitive loading on the outputs are increased which increases the time it takes for the RAM to operate. When there are many small RAMs: whose outputs are multiplexed together, the distance between RAMs increases. Thus, for example, multiplexing 8 RAMs together would incur enough of a loading such that half of the delay of the RAM would originate from driving the capacitive load of its outputs. If a 32×36 memory was driving a load of 5 pf, the access time would be 6.66 ns. As the number of cells decreases, it is easier to place destinations closer to the outputs of the RAMs, which will decrease the loading of the RAMs and therefore increase the performance of the inventive integrated circuits. A 256×36 RAM driving a load of only 1 pf would have an access time of only 4.5 ns. This is a 32% improvement over prior MAC devices. Again, such results have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals identify similar elements throughout the several views thereof.

DETAILED DESCRIPTION OF THE PRESENTLY PREFERRED EMBODIMENTS

Figure 1:
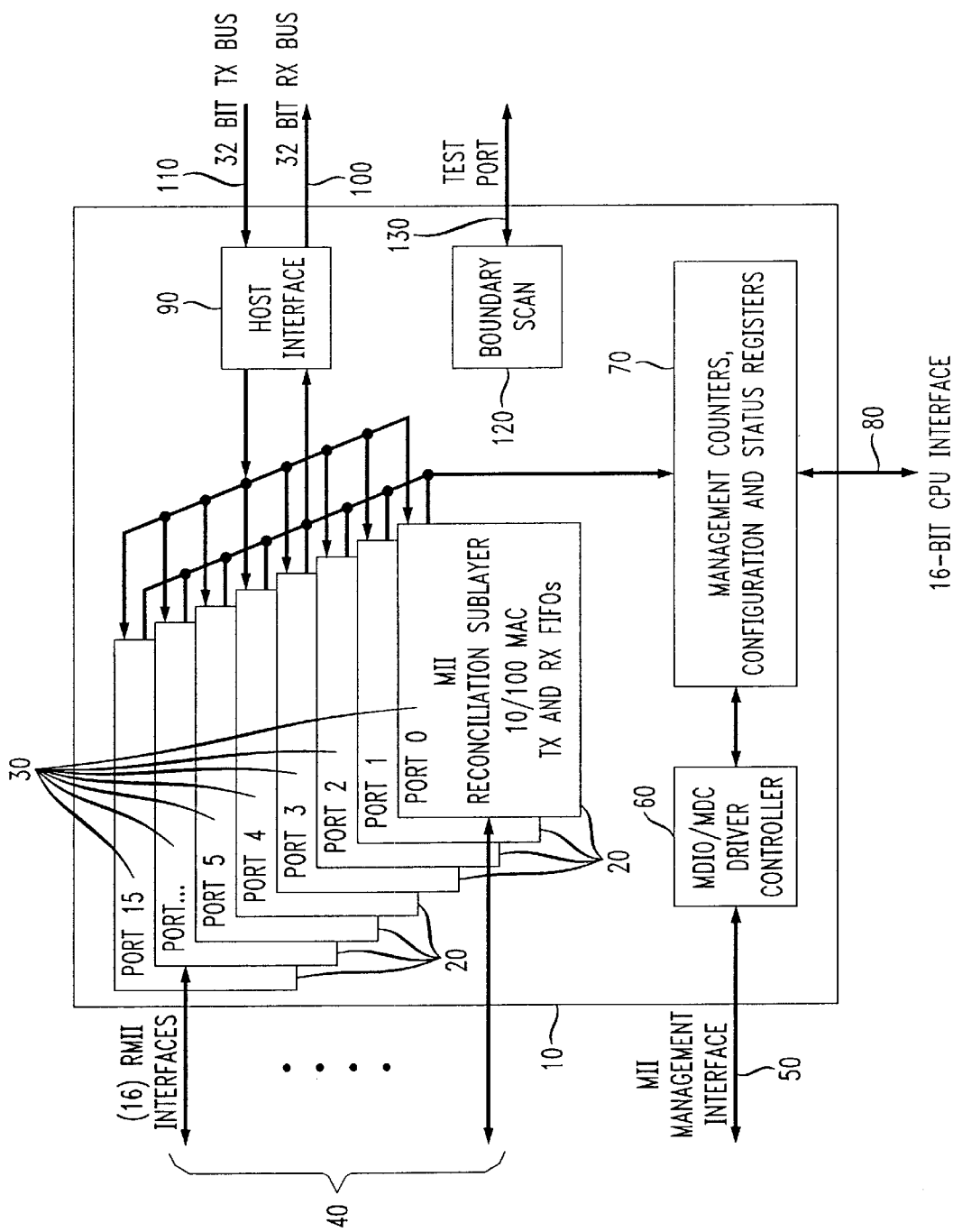
FIG. 1 is a block diagram of an integrated circuit of the present invention.

Referring now to the drawings, by way of illustrative example an integrated circuit of the present invention 10 comprises a plurality of media access controllers (MACs) 20. Each MAC 20 comprises at least one port 30. The inventive integrated circuits may be fabricated on a single integrated circuit chip, on a chip with multiple MACs, or as part of another chip such as an application specific integrated circuit (ASIC) wherein the MAC functionality disclosed and claimed herein will be integrated with the rest of the functions of the ASIC. It is currently preferred that each MAC 20 is a full duplex 10/100 Mbits/s Ethernet MAC that can readily be used for Ethernet frame switching or multi-port bridge applications in the single integrated circuit 10. Each of the MACs 20 interfaces to an off-chip physical layer device through a reduced media-independent interface (RMII) 40. Integrated circuit 10 further comprises a management interface (MII) 50 which accesses management registers such, by way of example, as control and status registers, in the physical layer. The MII 50 communicates with the integrated circuit 10 through a driver/controller circuit 60 which further communicates with a data management circuit 70 that provides counters, configuration registers and status registers to the MACs 20. The data management circuit 70 is controlled by an off-chip controller through a 16-bit CPU interface 80. A host interface 90 communicates with each of the MACs 20 and with the host through a 32-bit receive bus 100 and a 32-bit transmit bus 110. In a preferred embodiment, integrated circuit 10 further comprises a boundary scan circuit 120 which provides a test port 130 so that the integrated circuit 10 can more easily be tested.

Figure 2:
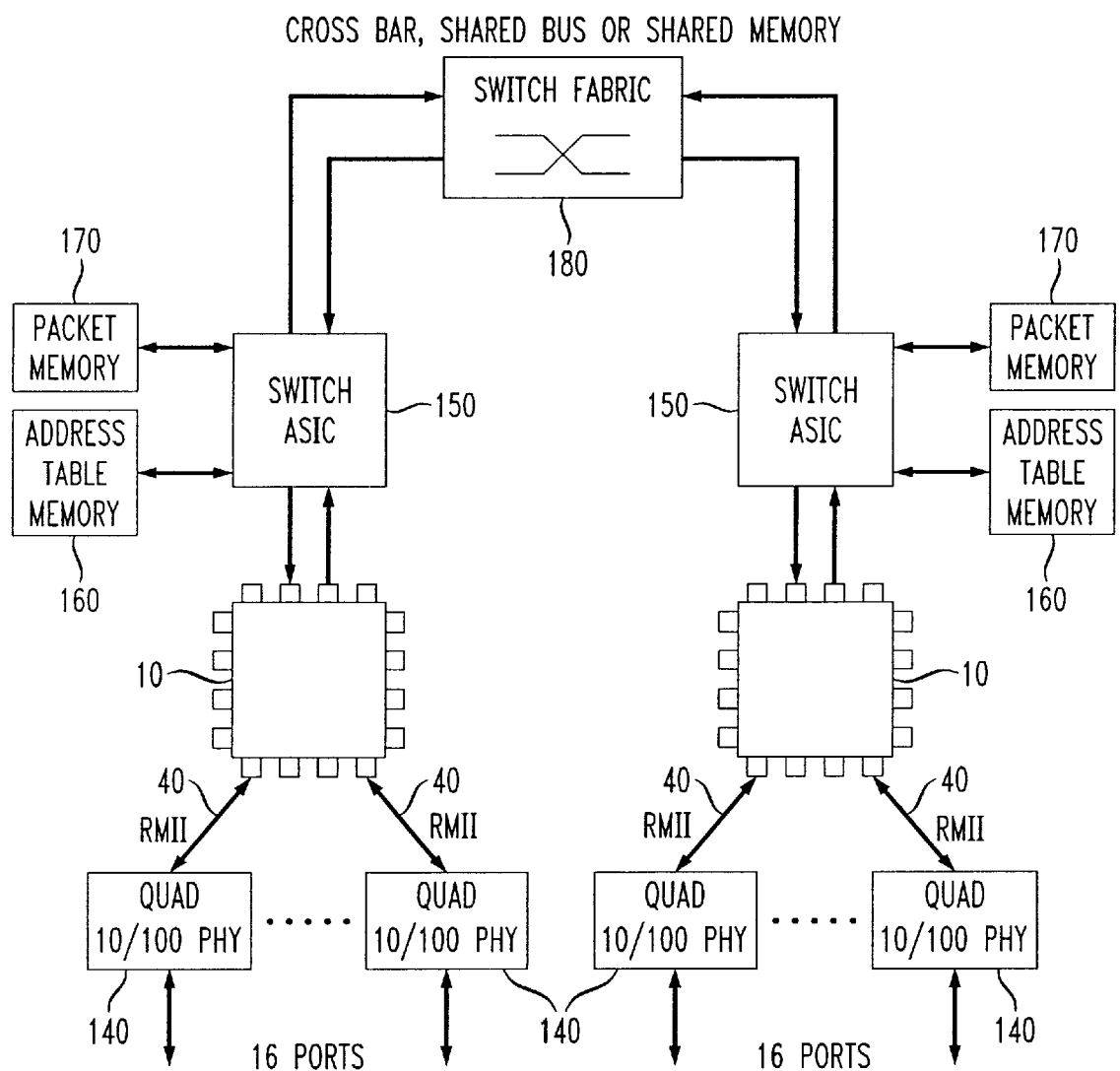
FIG. 2 is a block diagram of an Ethernet switch that utilizes integrated circuits of the present invention as MAC devices.

FIG. 2 is a block diagram which illustrates implementation of a 10/100 Mbit/s Ethernet 32-bit port switch that utilizes integrated circuit chips 10 constructed in accordance with the present invention. As discussed above, each of the chips 10 comprises sixteen RMII ports 40 which interface the chip to physical layer devices shown at 140. The chips 10 are further connected to switch application specific integrated circuits (ASICs) 150. As is typical in an Ethernet system such as that shown in FIG. 2, switch ASICs 150 switch address table memory data 160 and packet memory data 170 into the system according to the particular communication protocol which drives the Ethernet system. Switch fabric 180 is connected to the switch ASICs 150 which is, for example, a cross bar, shared bus or shared memory.

The integrated circuits 10 of the present invention are particularly useful in Ethernet systems such as that shown in FIG. 2 since they provide in a single integrated circuit chip sixteen full-duplex 10/100 Mbit/s Ethernet MACs for use in Ethernet frame switching or multiport bridge applications. In accordance with one aspect of the invention, the MACs themselves contain deep 256-byte transmit and receive FIFOs per port that enable the storage of multiple frames on-chip, retransmission of a frame after a collision, and rejection of undersized frames before any DMA activity occurs. The integrated circuits of the present invention are also quite versatile since they comprise extensive on-chip counters and registers for out-of-band network management. More particularly, block 70 (FIG. 1) comprises in the form of the inventive integrated circuit 10 herein disclosed nineteen transmit counters and twenty-two receive counters that provide enough raw data to implement the Ethernet Statistics Group which is critical to effective switch operation. Each of the counters are 32-bit to support throughput rates of 100 Mbits/s full-duplex Ethernet.

Figure 3:
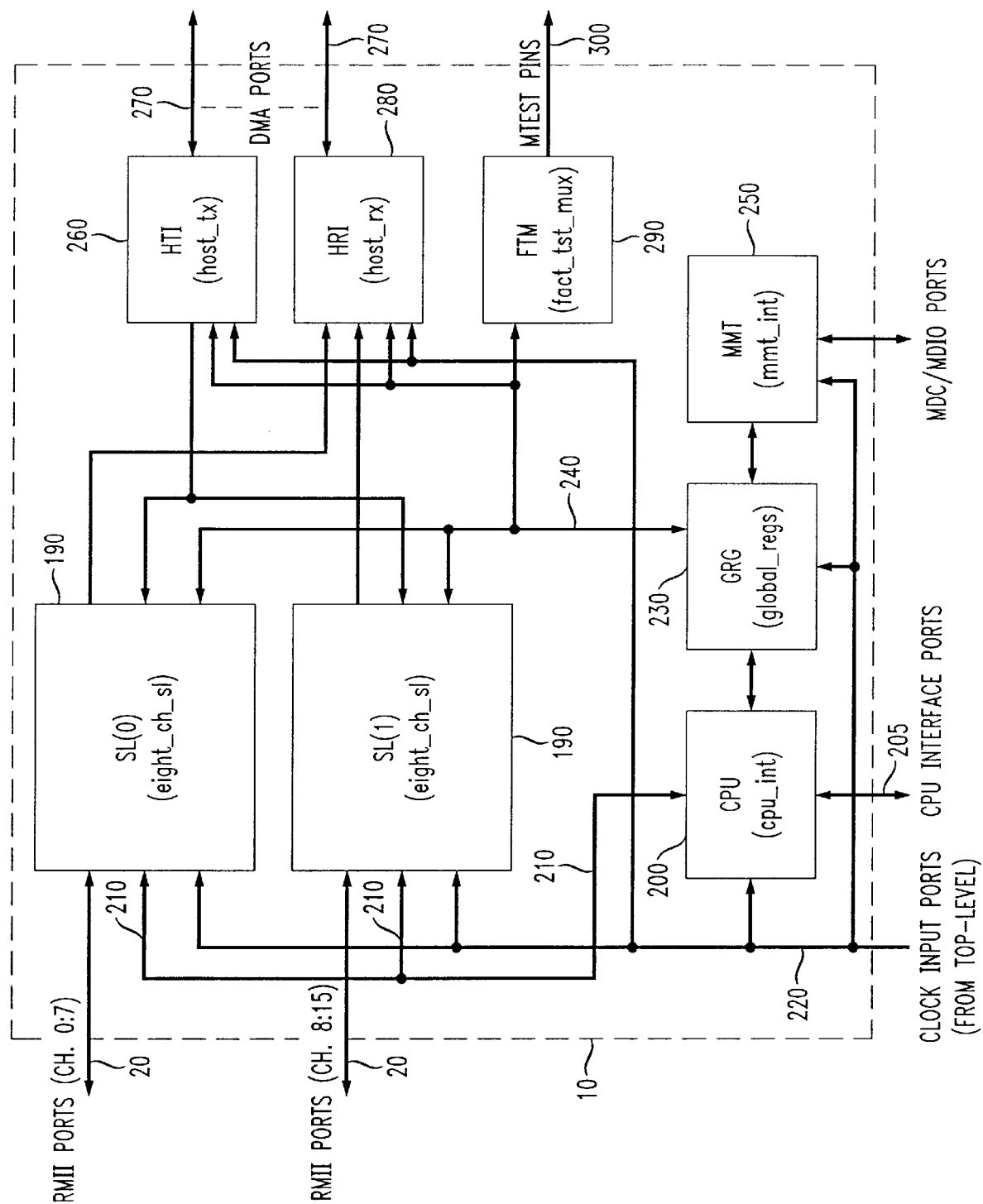
FIG. 3 is a block diagram of the core operating system of the integrated circuit of the present invention.

FIG. 3 depicts, the core operating system of the integrated circuit 10 which can produce 16 channels of data from the 16 MACs therein. RMII ports 20 are divided into two eight channel slices 190 so that integrated circuit 10 will produce slice data corresponding to each of the 16 MACs. Each of the eight channel slices 190 is connected to a CPU 200 which transfers data to and from the, eight channel slices 200 through data lines 210. The CPU is externally clocked through line 220 which also provides clock signals to each of the eight channel slices 190. Thus, each of the MACs comprising the two eight channel slices 190 receives independent clock signals that control DMA from the slices. CPU 200 receives data from global registers 230 which receive status data from the eight channel slices 190 through line 240. CPU 200 is responsible for retiming an asynchronous CPU interface 205 and for handling requests on this interface by sending control signals to the appropriate blocks in a device connected thereto. The global registers block 230 contains the global configuration and status registers for the integrated circuit 10.

The core of integrated circuit 10 also comprises a management interface (mmt_int) 250 which routes data through the circuit 10 and handles Ethernet/MAC physical layer management interfacing. A host transmit interface block (HTI) 260 interfaces to DMA ports 270, packs transmit data from the host and writes it to the proper transmit FIFO in the MACs. Similarly a host receive interface block (HRI) 280 is connected to the DMA ports 270 and processes host FIFO commands by reading data from the requested FIFO and presenting it to the host. A factory test multiplexer (FTM) 290 receives data from the eight channel slices 190 and funnels internal signals to test pin output ports 300 so that their values may be examined. FTM 290 is preferably programmable through the CPU interface 205.

Eight channel slices 190 contain eight single-channel copies. On the receive side, data is funneled from the channels to the host via a receive FIFO. On the transmit side, transmissions are scheduled to the channels and data is presented to the appropriate channel by a transmit FIFO. The channel copies themselves preferably contain per-channel CPU control logic as well as per-channel configuration and status registers and counters. During operation of the integrated circuit 10, receive data flows through the RMII ports 20 to the MACs and a block that synchronizes the data to the host clock domain. Transmit data flows from a block that synchronizes data from the host clock domain to the MAC transmit clock domain, to the MACs, and potentially through a loopback circuit before being transmitted back out through the RMII ports 20. Even more preferably, each channel copy also includes a per-channel clock buffer.

Figure 4:
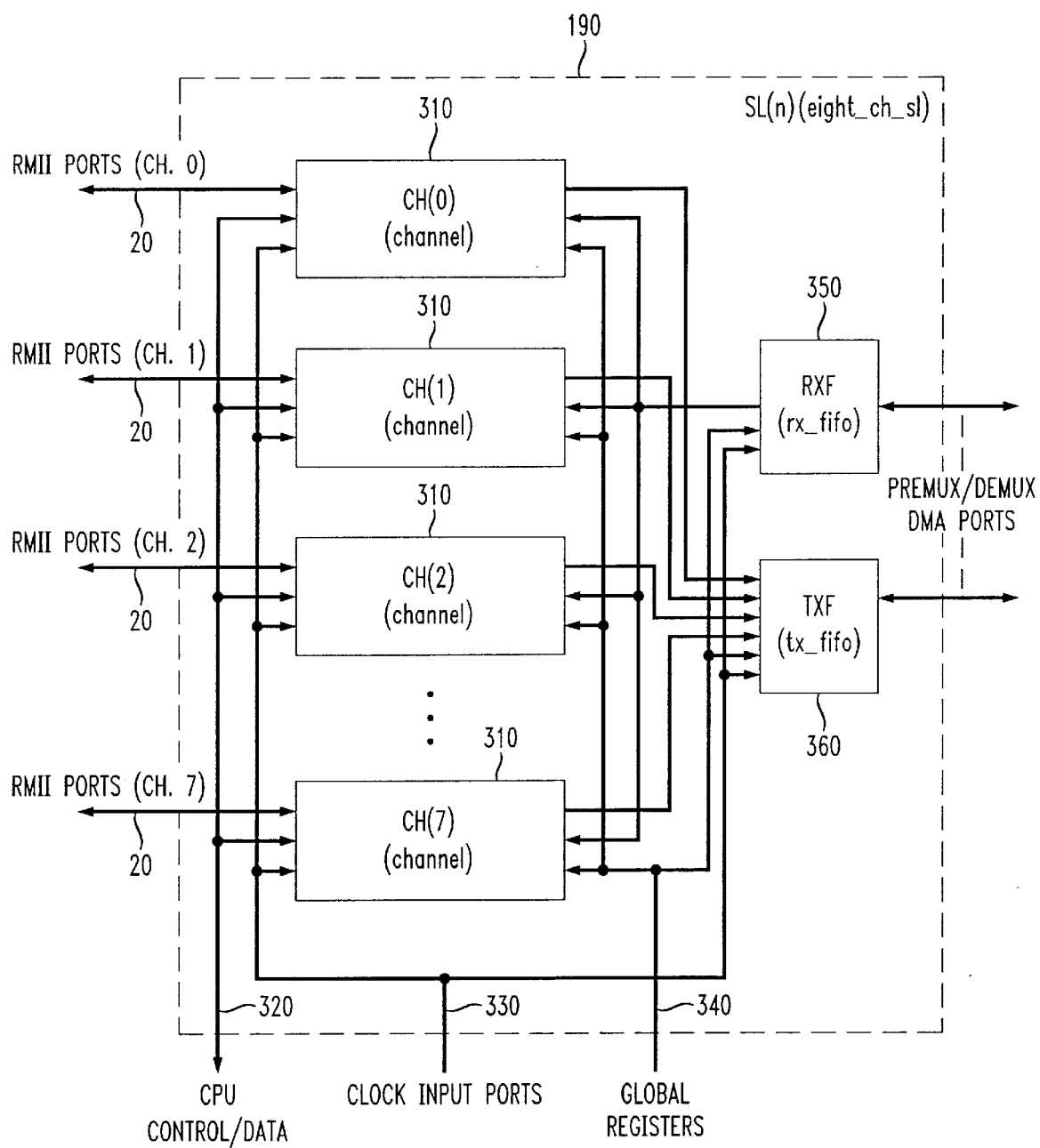
FIG. 4 is a block diagram of an eight-channel slice of the present invention.

An exemplary eight-channel slice 190 is illustrated in FIG. 4. Eight-channel slice 190 is formed of eight channels 310 which are each timed through a CPU control data line 320. Clock data is input to the channels 310 through clock input ports 330 and the status of each of the channels 310 is input to the global registers 230 through data line 340. A receive FIFO (RX FIFO) 350 is interfaced to each of the channels 310 and contains the physical memory used to implement eight receive FIFOs, one per channel, and also coordinates the arbitration and implementation of writes to these FIFOs. Similarly, a transmit FIFO (TX FIFO) 360 is interfaced to the channels 310 and contains the physical memory to implement eight transmit FIFOs, one per channel, and also coordinates the arbitration and scheduling of reads from these FIFOs.

The RX FIFO 350 and TX FIFO 360 can each hold multiple frames of data which are retransmitted automatically after a collision if the collision occurs within the first 64 bytes of the frame. Undersized frames and fragments can be rejected by these FIFOs before any bus activity begins. The RX FIFO preferably comprises an independent threshold for start of frame and midframe bursts to allow the destination address and source address to be read immediately. Since the RX FIFO 350 and TX FIFO 360 are buried deep within the eight-channel slice, they minimize the undesirable occurrence of overflows and underruns.

Figure 5:
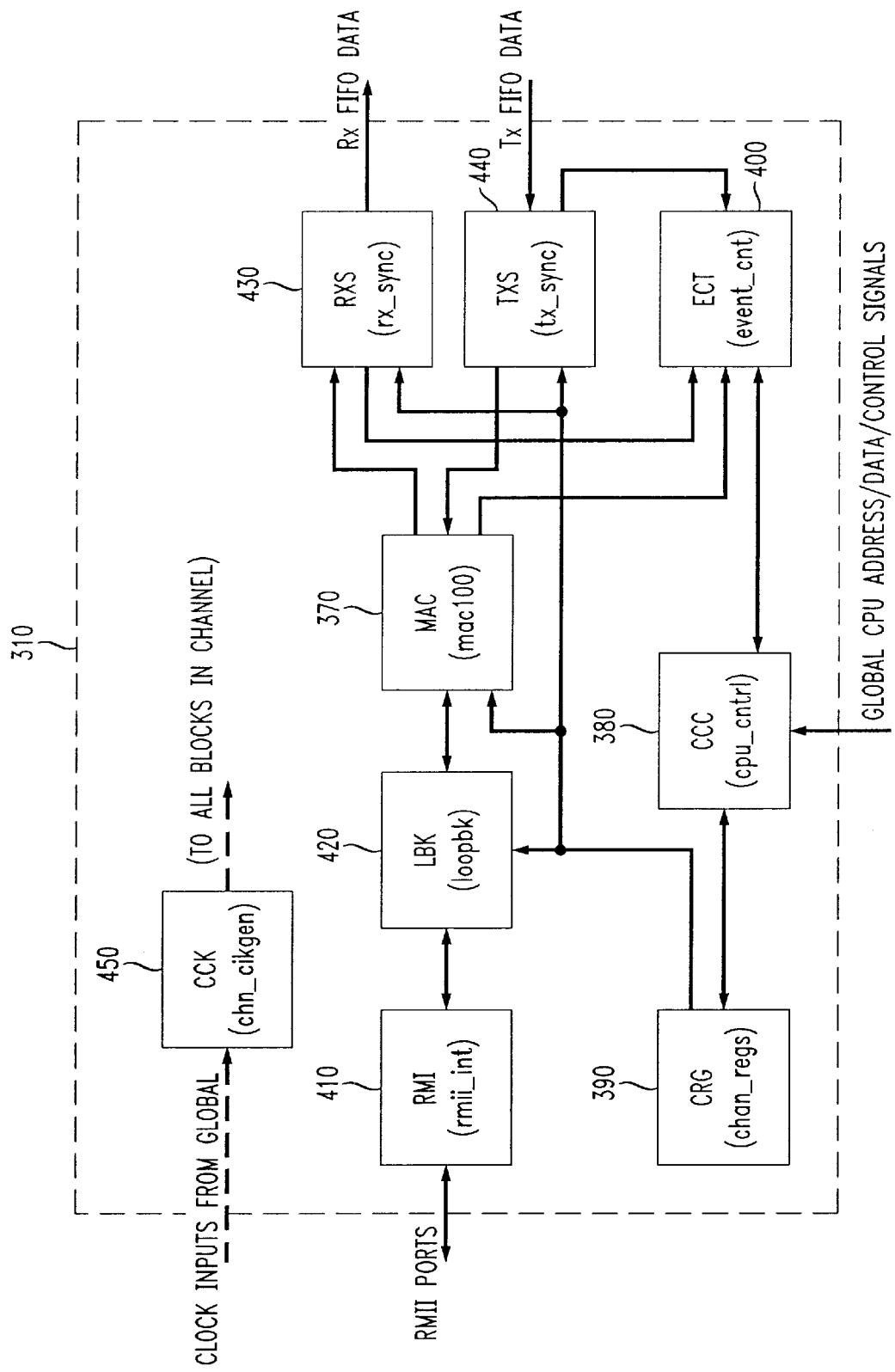
FIG. 5 is a block diagram of the channel architecture of the integrated circuit of the present invention.

FIG. 5 is a block diagram of a typical channel 310 that is implemented by integrated circuit 10 of the present invention. Block 370 is preferably a 10/100 Ethernet MAC implemented in accordance with the aforementioned IEEE 802.3u standards. Any suitable configuration of a MAC may be used in accordance with the invention, and there are many well-known designs on the market that may be implemented in integrated circuits of the present invention. A computer control (CCC) block 380 comprises an address decoder, data multiplexer and control signals for per-channel register and counter blocks. CCC block 380 communicates with channel registers (CRG) block 390 which contains all per-channel configuration and status registers for the integrated circuit 10. An event counter (ECT) block 400 is also preferably in communication with CCC 380 and contains all per-channel event counters which are required in accordance with IEEE 802.3u and any other standards with which integrated circuit 10 must comply.

The channel 310 of FIG. 5 also comprises an RMII conversion block 410 that contains all of the conversion logic necessary to drive the channel. RMII conversion block 410 is a glue that, on the receive side, converts the signals on the RMII port to MII-type signals for presentation to the MAC block 370. On the transmit side, RMII conversion block 410 takes the MII compliant signals from MAC block 370 and converts them to RMII-compliant signals which are then presented to the physical layer. In a further preferred embodiment, a loopback (LBK) circuit 420 is interposed between MAC block 370 and RMII conversion block 410. LBK circuit 420 is used for a test mode such that when the integrated circuit 10 is configured for loopback, the data transmitted from MAC block 370 is looped back to the receive port. LBK circuit 420 is optional and may be omitted from channel 310 if it is not desired or necessary to provide a test mode for integrated circuit 10.

Still more preferably, channel 310 comprises a receive synchronous block (RXS) 430 which retimes data from a receive clock internal to MAC block 370 to the integrated circuit's host clock domain and prepares the data for host RX FIFO queuing. Similarly, a transmit synchronous block (TXS) 440 retimes the data from the integrated circuit's host clock domain to the internal transmit clock of MAC block 370. Even more preferably, a clock buffering block (CCK) 450 is included in channel 310 and contains clock buffers necessary for per-channel clock distribution networking and buffering for circuit resets. Again, CCK 450 is optional and only needed for hierarchical layering where imbedded clock spining is required.

In accordance with a preferred aspect of the invention, the RX FIFOs 350 are implemented such that they share the same physical memory. The number of channel FIFOs sharing the same physical memory is parameterized and the eight ports RX FIFOs are implemented, in the herein disclosed integrated circuit 10, using a single physical memory that is 256 words deep and 72 bits wide. Because of the shared memory architecture of the RX FIFOs, this block is responsible for scheduling write requests to the memory which requires arbitration since requests can come from many channels simultaneously. RX FIFOs 350 also manage the host (read) side of the FIFO, indicating to the host when its data is available and acting upon the host's commands to retrieve data.

Figure 6:
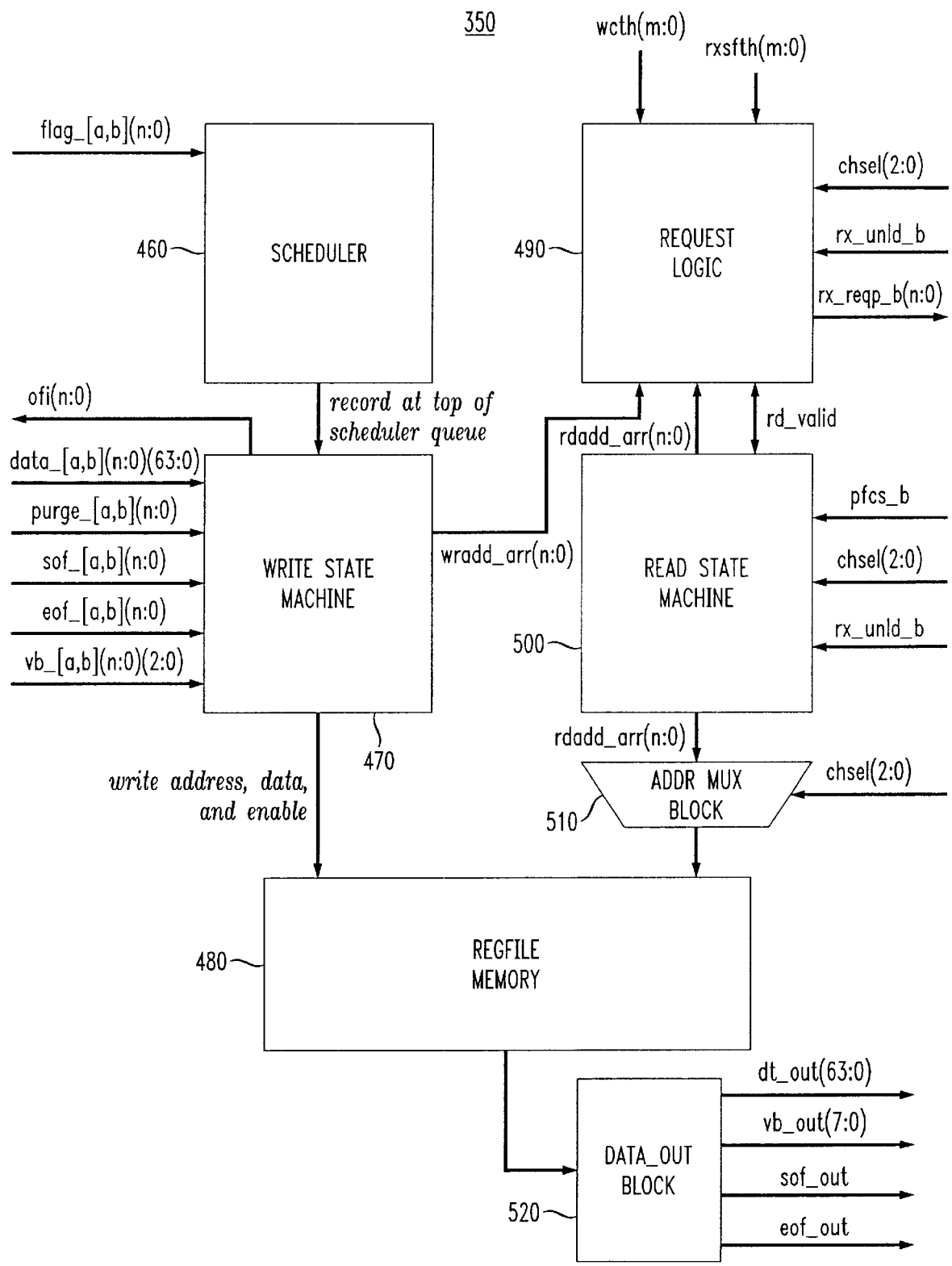
FIG. 6 is a block diagram of the receive data buffers of the integrated circuit of the present invention.

FIG. 6 is a block diagram that illustrates the logical operation of RX FIFO 350. As mentioned above, since integrated circuit 10 allows several channels to share the same memory, a scheduler 460 provides a scheduling or arbitration mechanism for the channels. Scheduling is implemented by block 460 which accepts write flags from each of the individual channels and builds a write queue based upon when these flags are toggled. A flag toggles when its corresponding ping-pong data register in the channel contains a full 64-bit word of data in the memory. Since the flags are synchronous to the individual port clocks, the flags must first be double-registered to synchronize them to the host clock. The synchronized signal is then edge-detected wherein the detection of an edge indicates that the write of the corresponding data is to be queued.

In a currently preferred implementation, each element of the queue created by scheduler 460 contains three fields. The first field is a bit called s_valid which indicates the existence of a valid write request. The second field is a three-bit field (assuming eight-port memory sharing) called s_chan which identifies the particular channel requesting the write. The third field is a one-bit field called s_toggle that indicates which ping-pong register (A or B) contains the full word to be written.

Scheduler 460 is more preferably implemented in two queues: a primary queue and a secondary queue. Writes are always scheduled based on the record at the head of the primary queue. When a write request is detected by the scheduler logic, the logic first determines the queue to which the request must be appended. A set of registers, one for each channel, keeps track of whether a request for that channel is queued in the primary queue. If a request for that channel has already been queued in the primary queue, then the new request is appended to the tail of the secondary queue; otherwise, the new request is appended to the tail of the primary queue. Requests contained in the secondary queue are serviced based on a "promotion" or "first come, first served" scheme. If in a given cycle no new requests are queued in the primary queue, then the primary queue contains a "hole" which is filled by promotion of the request at the head of the secondary queue to the tail of the primary queue.

This priority queuing scheme is appropriate since, without it, a request from a given channel can get "parked" behind two requests from each of the other channels. Such a circumstance takes on added severity if one of the two requests from each port is the last word in an Ethernet frame (FOF) write which must be followed by a STATS write. In that case, 3(n−1) clock cycles (where n is the number of ports being served by this instantiation of RX FIFO 350) could elapse before this write request is serviced. As the number of channels increases, the duration of the wait increases which could have catastrophic effects since the data in the ping-pong register corresponding to this write request could get overwhelmed by incoming data before the request is ever serviced.

Scheduler 460 is interfaced to a write state machine (WSM) 470 that controls writes to RX FIFO 350. WSM 470 preferably has four states: rst_state, normal, stat_write and ofi_stat. The first state, rst_state, is simply the reset state, which is entered when the block is being reset; the primary action during this state is that the write pointers for each of the FIFOs are reset. From this state, WSM 470 automatically proceeds to the normal state.

The normal state is almost a default state for WSM 470 in the sense that WSM 470 spends most of its time in it. In the normal state, the top of the primary queue is read, and if the s_valid bit is set, then a write request is at the top of the queue. WSM 470 then reads the channel number and ping-pong register indicated by the s_chan and s_toggle fields and sends the corresponding data to the memory to be written, along with the EOF, the first word in the Ethernet frame (SOF), and the valid bytes (VBs). The data is written into the FIFO as a single word formed by the concatenation of these four fields. The correct address pointer is also computed and sent to the memory so that the data word is written to the proper address of the memory.

Under normal circumstances, it is preferable that WSM 470 remain in the normal state after processing the write and reading the next element of the primary queue. However, two conditions will cause WSM 470 to proceed into a different state. The first condition is the EOF case which is a normal part of the operation of integrated circuit 10. If EOF is set for the given write, the word being written to the FIFO is the last word in the frame; that is, the "write status bus signal" (STATS) write for that channel needs to occur in the next cycle. In that instance, WSM 470 performs this write in the next state which is stat_write. The second condition that causes WSM 470 to move form the normal to another state is actually an error condition. If during the normal state the address comparator in WSM 470 has determined that the current scheduled write will overrun the FIFO, then WSM 470 makes a determination (depending upon whether any part of the frame has been read by the host) as to whether to purge the frame or end the frame by writing EOF in the current cycle and STATS in the next cycle. If it chooses the latter, then WSM 470 must jump to the ofi_stat state to STATS which, for this case, has only the least significant bit (the OFI bit) set. All other bits in the STATS word are set to "0". After the stat_write or ofi_stat state, WSM 470 returns to the normal state in which the top of the primary queue is read to see if another write is required.

WSM 470 then writes addresses and data to REGFILE memory 480. In a currently preferred embodiment of the invention, eight channels share a single REGFILE memory 480 which is 256 words deep and 72 bits wide. Though REGFILE memory 480 is 72-bits wide, only 64 bits of this are data. Since REGFILE memory 480 is shared evenly among the eight channels, each channel has 32 words of buffering or 256 bytes. The 63rd bit of REGFILE memory 480 is SOF, the 64th bit is EOF, bits 65 through 68 are valid bytes (VBs) and bits 69 through 71 are reserved.

Request logic block 490 determines whether RX FIFO 350 has enough data to request a read from the host. Preferably, this occurs by determining the occupancy of RX FIFO 350 based upon the read and write pointers and comparing this to the receive start of frame threshold (RXSFTH) or the word count threshold (WCTH) when appropriate. The logic preferably never asserts a RX FIFO DMA request in the midst of a read burst or if the last read on the given port was EOF (meaning the current read is STATS). Assuming that neither of these conditions are true during a given cycle, the logic will request a read from the host under the following conditions: (1) where there is a complete frame in the FIFO, RX FIFO DMA is asserted irrespective of the thresholds in this case; (2) the frame at the top of the FIFO has not been read yet and the RXSFTH threshold has been excluded; or (3) the host has begun to read the frame at the top of the FIFO and the WCTH threshold has been exceeded.

At this point, read state machine (RSM) 500 is initiated. RSM 500 has two states; rd_stat and rd_normal. The first (rd_stat) is a reset state that simply resets the FIFO read pointers, RX FIFO DMA signal, and internal control signals. The rd_normal state is responsible for processing the read commands from the host based upon the states of the channel select (CHSEL), the port FIFO chip select (PFCS_B) and the RX FIFO DMA Acknowledge (RX_UNLD_B). RMS 500 outputs the read pointers and certain of the control signals.

Next, an address multiplexer (ADR MUX) block 510 applies read address multiplexing to the data. In setting the read pointers, RSM 500 logic updates an array of integer address pointers, the width of the array being equal to the number of ports supported by this instantiation of RX FIFO 350. These array values must be multiplexed down to a single read address driven to the memory, and the timing of this action is very critical. This is a partitioning that allows ADR MUX 510 to be synthesized independently so that special attention can be given to the logic synthesis. Finally, data_out block 520 implements the output data in a block statement which allows this logic to be isolated in synthesis.

An advantage of shared memory architecture in accordance with the present invention is that it reduces the number of discrete memories needed on integrated circuit 10 which, in turn, decreases the area of the design and improves routability and timing. However, this architecture also introduces a memory bandwidth concern since instead of one channel having free reign over access to the memory, eight channels must share the limited number of cycles available to access the memory. In practice, therefore, consideration should be given to the memory bandwidth needs of the system, implementation constraints must be derived, and an arbitration scheme must be developed to ensure that the required memory accesses can be scheduled.

The first consideration in determining the limitations of the architecture is simply to identify the raw memory bandwidth needed. Assume that the memory is running at a minimum specified frequency of 25 MHz which is the same as the frequency of the MAC. Also assume that each channel requires maximum bandwidth. The worst-case bandwidth required is when the interframe gap (IFG) is zero, the preamble is zero, the SFD is one octet or two cycles, and the frame itself is one byte or two cycles. In this situation, a complete frame could thus be received every four cycles. The number of accesses required to the memory is two: one for the data and one for the statistics write. With this kind of architecture, the integrated circuit cannot support memory sharing of too many channels.

One preferred solution is to set a minimum frame size to be supported. Consider by way of example a minimum frame size of nine bytes. This requires a minimum of 20 clock cycles for reception of a full frame. The number of writes required is three: one for the first eight bytes of data, one for the last byte, and one for the statistics. If each port requires three writes per 20 cycles, the most ports that could share a single memory is six, which is still short of eight. Thus, for eight ports the architecture sets the requirement that frames be a minimum of 16 bytes in length, a multiple of eight. To meet this requirement, the worst case would be a 17-byte frame, which could arrive every 34 clock cycles. A frame of this size requires four writes: two for the first two eight-byte words, one for the last word, and one for statistics. The memory therefore has enough bandwidth to support four writes for eight ports every 34 clock cycles.

Figure 7:
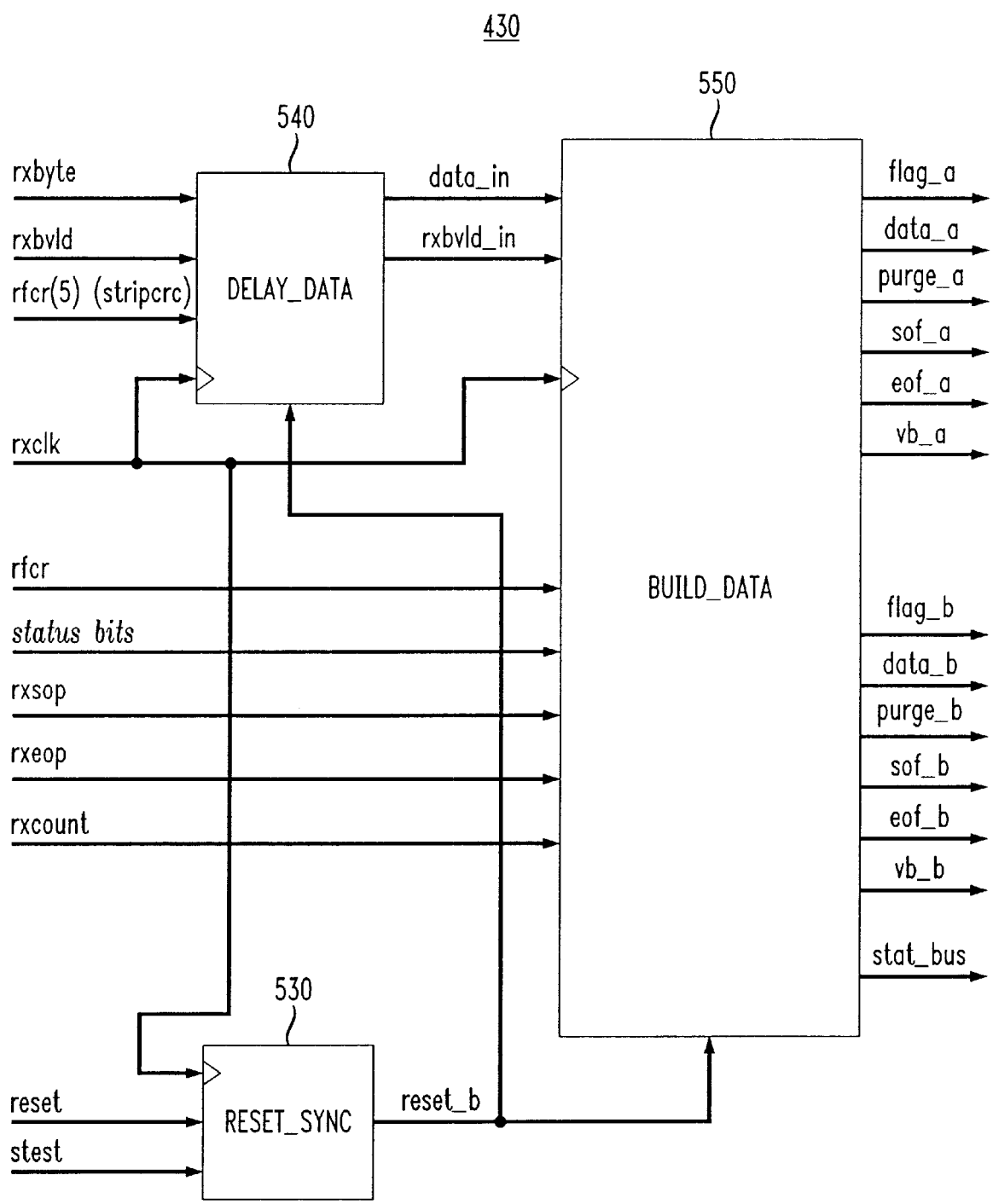
FIG. 7 is a block diagram of the receive synchronization block which retimes the channels received from MACs in the integrated circuit of the present invention.

FIG. 7 is a logical block diagram of the RXS block 430 (FIG. 5) which is responsible for retiming data received by a MAC from the MAC receive clock (RXCLK) domain to the host clock (HCLK) domain. RXS 430 assembles the octets received from the MAC into 64-bit words that can be stored in the RX FIFOs 350. RXS 430 also sets flags which alert RX FIFOs 350 that a fully assembled word has been prepared and can be scheduled for queuing in the FIFO.

RXS 430 includes a reset synchronous logic (reset sync) block 530 that synchronizes the rising edge of the negative active reset pulse that feeds every flip-flop in RXS 430. During normal operation, the rising edge of the RESET signal is synchronized to the RXCLK domain so that all flip-flops come out of reset on the same cycle. In scan test mode, the reset bypasses the synchronization logic and feeds all flip-flops directly.

A delay data logic block 540 is interfaced to reset sync block 530. In standard MAC devices, the "receive end of packet" (RXEOP) signal is driven from the MAC in two cycles (three cycles for misaligned frames) after the "last receive data" (RXDATA) and "receive valid byte" (RXBLVD) signals. The RXDATA and RXBLVD signals must be delayed so that they line up with the late RXEOP information. Since RXS 430 already contains data buffering, it is preferable to add a CRC stripping function here which will strip the CRC error signal that is produced by a MAC when a packet is received with proper nibble alignment but with incorrect CRC. Data entering delay data block 540 is stored in a five-octet buffer. When integrated circuit 10 is not in a "stripCRC" mode, the data forwarded to build data block 550 is the first word in the buffer which is the two-cycle-delayed RXDATA, the last octet of which lines up on the same cycle as RXEOP. In stripCRC mode, the data forwarded to build data block 550 is the fifth word in the buffer which is the ten-cycle-delayed RXDATA. In this case, the last RXDATA octet processed is the fifth to last one which lines up on the same cycle as RXEOP. The remaining octets in the buffer are the CRC which are discarded.

Build data block 550 is responsible for accepting Ethernet frame octets received by the MACs and assembling them into 64-bit words that are queued in RX FIFO 350. This data to be forwarded to RX FIFO 350 is prepared in two ping-pong registers denoted DATA A and DATA B. When DATA A contains a full 64-bit word, a flag (FLAG A) that corresponds to this ping-pong register toggles to indicate to RX FIFO 350 that a request has been made to write this word into the FIFO. During the time this write is pending, RXS 430 may still be accepting frame data from the MAC. The second ping-pong register, DATA B, is used to accept this additional incoming data. When DATA B contains a full word, new incoming data is written to DATA A. It is important that RX FIFO 350 keep up with RXS 430 since the last write request of DATA A must be serviced before DATA A begins accepting new data to avoid collisions with the as-yet unqueued data in DATA A. RX FIFO 350 insures that data requests are properly scheduled in the correct time frames.

Other information is passed to RX FIFO 350 together with the data. Each ping-pong register also has corresponding EOF, SOF, VB and purge flags (PURGE) data. This information is either stored in REGFILE memory 480 or provides directives to RX FIFO 350 concerning the manner in which this data is to be handled. RXS 430 is also responsible for assembling the status word (STAT BUS) that RX FIFO 350 enqueues at the end of the frame. STAT BUS contains a byte-count for the frame along with status bits.

Figure 8:
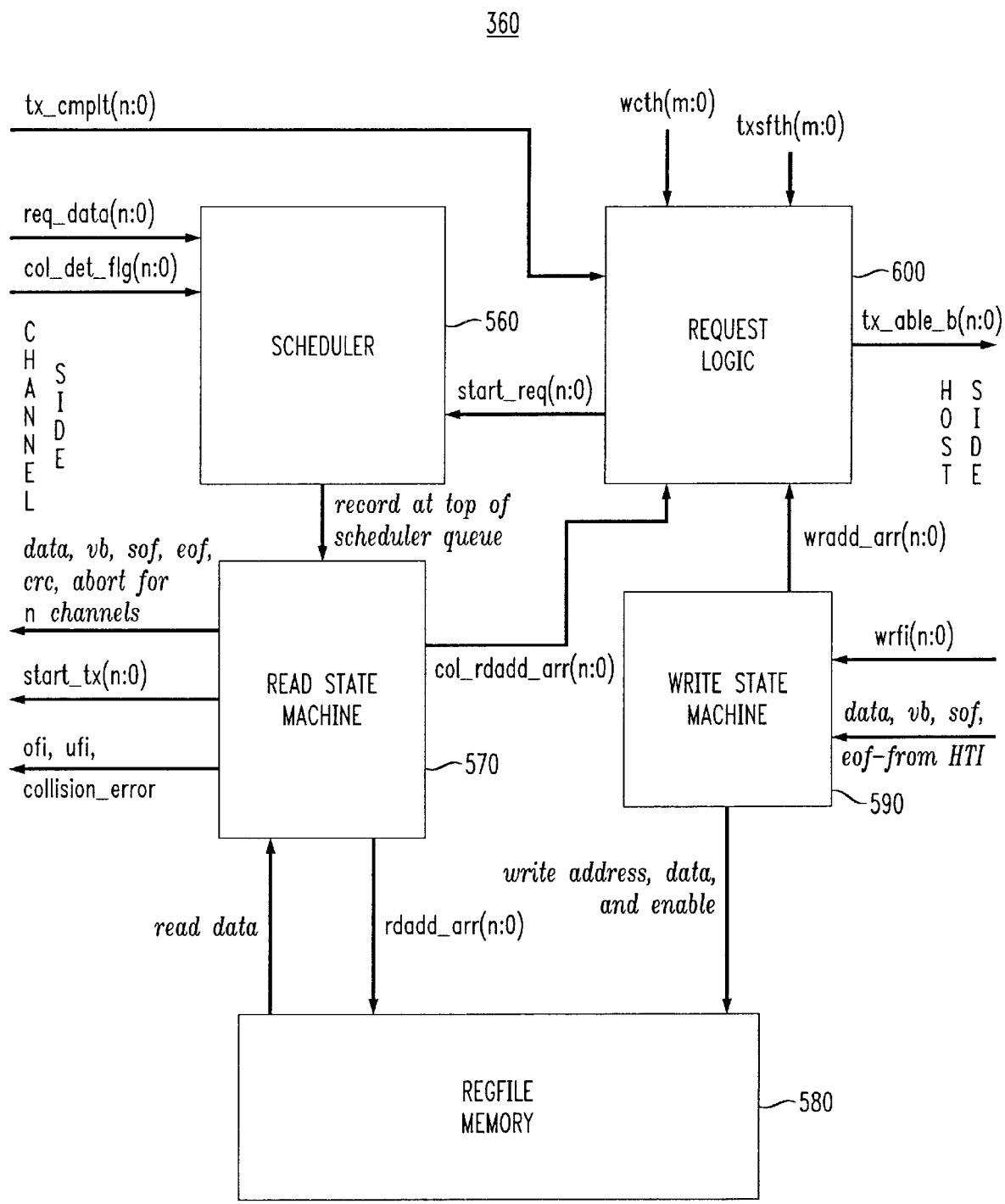
FIG. 8 is a block diagram of the transmit data buffers in the integrated circuit of the present invention.

FIG. 8 is a logical block diagram of TX FIFO 360. TX FIFO 360 includes the transmit data buffers, the writes of which are controlled by the host through the host transmit interface 260. The logical architecture of TX FIFO 360 is preferably similar to that of RX FIFO 350 in that a unique shared memory architecture is used to accomplish the buffering. Similarly, the TX FIFOs 360 are implemented such that they share the same physical memory. In the currently preferred embodiment herein disclosed, the FIFOs for eight ports are implemented using a single physical memory that is 256 words deep and 72 bits wide. TX FIFO 360 is responsible for scheduling reads of data that is sent to the channels to be transmitted by the MACs. As with the RX FIFOs 350, this requires arbitration with additional complications arising from collisions and retries. TX FIFO 360 also manages the host (write) side of the FIFO which indicates to the host when it has room in the memory to accept data and acts upon the host's commands to transmit the data.

Scheduler logic block 560 provides arbitration or scheduling of the channels similar to that performed by scheduler 460 in RX FIFO 350. Based on requests from the channel at the host and at the start of a frame, a queue of FIFO access requests is built. On each HCLK cycle, an element is read from this queue to direct the operation of RSM 570. This process accepts the "collision detected flag" (COL DET FLG) and "request data signal flag" (REQ DATA) from each of the channels, and the "start request flag" (START REQ) from request logic block 600, which are derived from a host transmit request. In the case of the channel flags, these signals are toggle signals synchronous to the TXCLK domain which must be double-registered and then edge-detected. START REQ is a pulse. Events on these signals initiate entry appends to the queue.

Each element of the queue contains three fields. The first is a bit called s_valid which indicates the existence of a valid request. The second is a three-bit field (assuming eight-port memory sharing) called s_chan which indicates the channel requesting the write. The third is a one-bit field called s_request_mode which indicates the type of action to be taken by RSM 570; the request can be either a simple read request in response to REQ DATA, a retry request in response to COL DAT FLG, or a request to initiate a frame transfer in response to START REQ. Each of these requests requires a single access to memory, but each will have different affects on how address pointers are updated. Unlike the queue in RX FIFO 350, the length of the queue in TX FIFO 360 is equal to the number of channels sharing the memory, which in the herein-disclosed embodiment is eight. Since the transmit side of integrated circuit 10 does not have the ping-pong register scheme, it need not be concerned with multiple requests from the same channel.

RSM 570 controls the read side of the FIFO memory. RSM 570 has two states: rd_rst_state and rd_normal. The first is a reset state that simply resets the FIFO read pointers and internal control signals. The second is responsible for processing the read request records from the scheduler stack. In full duplex mode, this operation is straightforward. In half duplex mode, collisions on the medium can occur and can cause the MAC to attempt retries. RSM 570 logic must insure that none of the data for a frame is overwritten until the first 64 bytes have been transmitted successfully. To accomplish this result, RSM 570 keeps track of a read pointer, rdadd_arr, and a pointer to the beginning of the frame, denoted col_rdadd_arr. RSM 570 handles underflows by performing pointer comparisons, and handles collision errors. It also generates a start transmission signal (START TX) which is sent to the channels to indicate the start of transmission. RMS 570 preferably also presents the data, the VB, EOF, and SOF indicators, and the append CRC signal, all of which are read from the memory to the channels.

The size of REGFILE memory 580 and the number of channel FIFOs is configurable in accordance with the invention as a function of the particular operating requirements that integrated circuit 10 is intended to fulfill. In a preferred embodiment, eight channels share the single REGFILE memory 580 which is 256 words deep and 72 bits wide. Again, although REGFILE memory 580 is 72-bits wide, only 64 bits of this are data. Since the REGFILE memory 580 is shared evenly among the eight channels, each channel has 32 words of buffering or 256 bytes. The write operation for REGFILE memory 580 is synchronous while the read operation is asynchronous.

Write state machine (WSM) 590 controls the write side of TX FIFO 360. WSM 590 has two states: the rst_state which is a reset state that simply resets the FIFO write signals and internal controls signals, and the normal state which is responsible for processing the host transmit commands through the HOST TX logic 260. WSM 590 assembles the word to be written into the FIFO and is responsible for write pointer processing. It also generates overruns.

Request logic block 600 is responsible for determining whether TX FIFO 360 has enough free space to notify the host that it can accept a write burst from the host. This is accomplished by asserting signal "transmit FIFO able indication" (TX ABLE B) which is a signal that is low when TX FIFO 360 is capable of accepting data. To accomplish this result, the occupancy of the FIFO is determined based upon read and write pointers and compared to the word count threshold (WCTH). Preferably, request logic block 600 will never assert TX ABLE B in the midst of a write burst. Request logic block 600 also generates the signal START REQ which is sent to scheduler logic block 560 to indicate that the frame data in REGFILE memory 580 can be transmitted. To determine whether data transmission is possible, the read and write pointers are compared to the signal "transmit start of frame threshold" (TXSFTH).

As with the RX FIFO 350, the shared memory architecture of TX FIFO 360 creates bandwidth constraints that should be considered with designs in accordance with the present invention. However, on the transmit side these constraints are much simpler to handle as compared to the receive side discussed above. On the transmit side, at most one host request can arrive per clock cycle and memory writes can take place on every write cycle which is sufficient to accommodate the frequency of requests. Since integrated circuit 10 does not have a mode in which it can send an IFG in less than 96 bit times (24 TXCLK cycles), one-byte frames will not give the maximum memory bandwidth requirement from the MAC. Instead, the worst case is for very long frames when integrated circuit 10 requires data at a consistent rate of one 64-bit word every 16 TXCLK cycles. The memory running at the same speed can easily deliver one word every 16 clock cycles, and with eight-channel memory sharing, it can deliver two words every 16 clock cycles. Thus, for TX FIFO 360, memory bandwidth will not be a problem for eight channel sharing.

Figure 9:
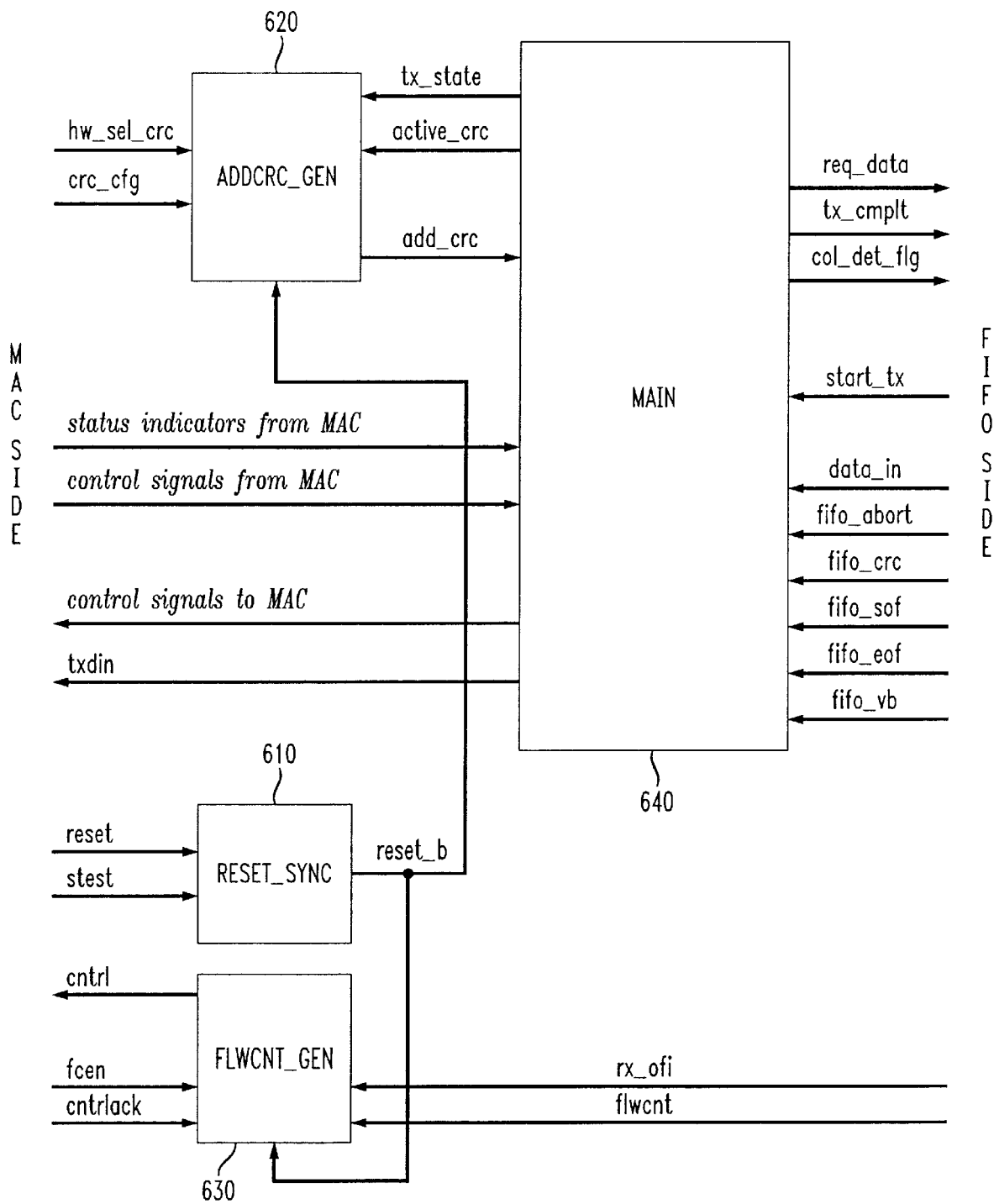
FIG. 9 is a block diagram of the retiming domain between the transmit FIFO and a MAC in the integrated circuit of the present invention.

FIG. 9 is a logical block diagram of TXS 440 (FIG. 5) which provides a retiming glue between TX FIFO 360 and the MAC. TXS 440 requests 64-bit words of data from TX FIFO 360 which operates off the HCLK domain, then retimes the data to the TXCLK domain and presents it to the MAC a single octet at a time. TXS 440 also handles retiming flow control signals and CRC-append-mode control signals. This block also contains significant collision and error handling functions including aborting of the MAC and flushing of the TX FIFO 360 when appropriate. TXS 440 is also responsible for padding of frames which contain fewer than 60 bytes.

A reset sync logic block 610 synchronizes the rising edge of the negative-active reset pulse that feeds every flip-flop in the TXS 440. During normal operation, the rising edge of the RESET signal is synchronized to the TXCLK domain so that all flip-flops come out of reset on the same cycle. In scan test mode, the reset pulse bypasses the synchronization logic and feeds all flip-flops directly.

Address code generator logical block (addcrc gen) 620 generates a signal called ADD CRC which is used in the MAIN logic block 640 to ultimately produce the append CRC (APNDCRC) signal that is sent to the MAC. Addcrc gen 620 takes the configuration bits HW SEL CRC and CRC CFG and the FIFO CRC signal from TX FIFO 360 and sets the ADD CRC signal based upon the logical expression (HW SEL CRC and FIFO CRC) or (HW SEL CRC and CRC CFG). The registered ADD CRC signal is reset when the MAIN state machine 640 is in the wait_for_start state.

In a preferred embodiment, a flow control generator block (flwcnt gen) 630 generates a flow control signal, CNTRL, which indicates to the MAC that a flow control frame should be transmitted. Flwcnt gen 630 takes the configuration bit, FCEN, and the control signals RX OFI (which indicates that a RX FIFO has overrun) and FLWCNT (which indicates that the system wishes to assert flow control), and generates the CNTRL signal. Since FLWCNT and RX OFI signals arrive on different clock domains, they must first be synchronized. These synchronized versions of the signals are then used to generate the CNTRL signal based on the logical expression FLWCNT or (FCEN and RX OFI). The registered CNTRL signal is reset by the control acknowledge (CNTRLACK) signal from the MAC.

Figure 10:
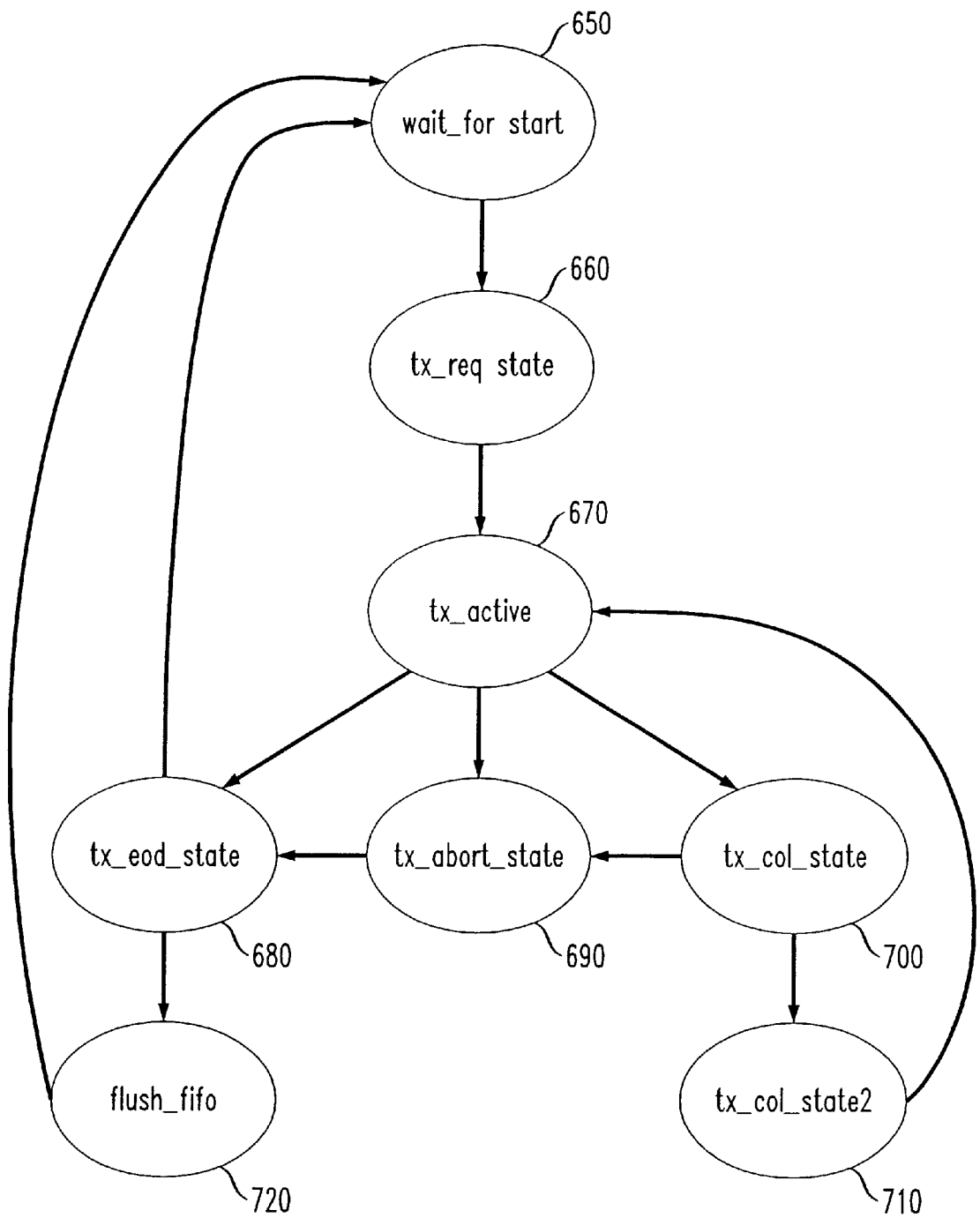
FIG. 10 is state machine logic diagram for transmission of signals through integrated circuits of the present invention.

A state diagram for MAIN state machine 640 is illustrated in FIG. 10. State 650 is a wait_for state which is the reset state for TXS 440. MAIN state machine 640 always returns to state 650 at the conclusion of a frame transmission or when TX FIFO 360 is flushed. In state 650, MAIN state machine 640 waits for a START TX assertion from the TX FIFO's logic, which indicates that TX FIFO 360 has ample data to begin a frame transmission. MAIN state machine 640 then asserts signal TXREQ to the MAC to request frame transmission and strobes the data and control signals coming in from TX FIFO 360.

After state 650, MAIN state machine 640 enters state 660, the tx_req_state in which the logic waits for acknowledgement of the request from the MAC (via TXACK) before preparing the first byte of data to present to the MAC and entering the tx_active state 670. State 670 is the primary state in which MAIN state machine 640 remains during normal frame transmission. State 670 handles presentation of frame data to the MAC, requests new frames (via REQ DATA) form TX FIFO 360, and aborts frames (asserting TXABORT) when error conditions occur. State 670 also controls padding when frames containing fewer than 60 bytes are presented.

The end of transmit data state (tx_eod state) 680 is always traversed by MAIN state machine 640 during any single transmission attempt. State 680 is responsible for either ending a normal transmission gracefully by asserting the transmit complete signal (TX CMPLT) to TX FIFO 360, or flushing TX FIFO 360 during an error condition. When an error condition occurs, state 690 is entered which is an abort transmission (tx_abort) state. State 690 waits for an acknowledgement of the abort (TXABORT) from the MAC (ABORTED) before entering state 680.

When a collision is detected (via a collision detection signal, COLDET), a collision detection state (tx_col_state) 700 is generated. State 700 is entered from state 690 and waits for the MAC to begin another transmit attempt of the frame, which the MAC reports by asserting the signal TXINPROG to indicate that a transmit is in progress. In the case of excessive deferral, state 700 aborts the frame by asserting the signal TXABORT and returns to the tx_abort state 690. Once TXINPROG is asserted, the first word of data (DATA IN) from TX FIFO 360 is strobed and the machines passes to state 710.

State 710 is a second collision detection state, tx_col_state2, which MAIN state machine 640 will always pass through in the case of a retry after a normal collision and receipt of signal TXINPROG while in state 700. State 710 prepares the first byte of frame data (TXDIN) to be transmitted by the MAC and then returns control to state 670.

State 720 is a flush TX FIFO (flush_fifo) state that is entered from state 680 when an error condition has occurred in an earlier state and TX FIFO 360 must therefore be flushed. The flushing process is "brute force" in nature in that state 720 requests data (via REQ DATA) from TX FIFO 360 every 16 cycles, as it does in normal operation, until it receives the flag FIFO EOF which is set when DATA IN represents the last word in the Ethernet frame. After state 720 is executed, MAIN state machine 640 returns to state 650 where the entire process may be initiated again.

Figure 11:
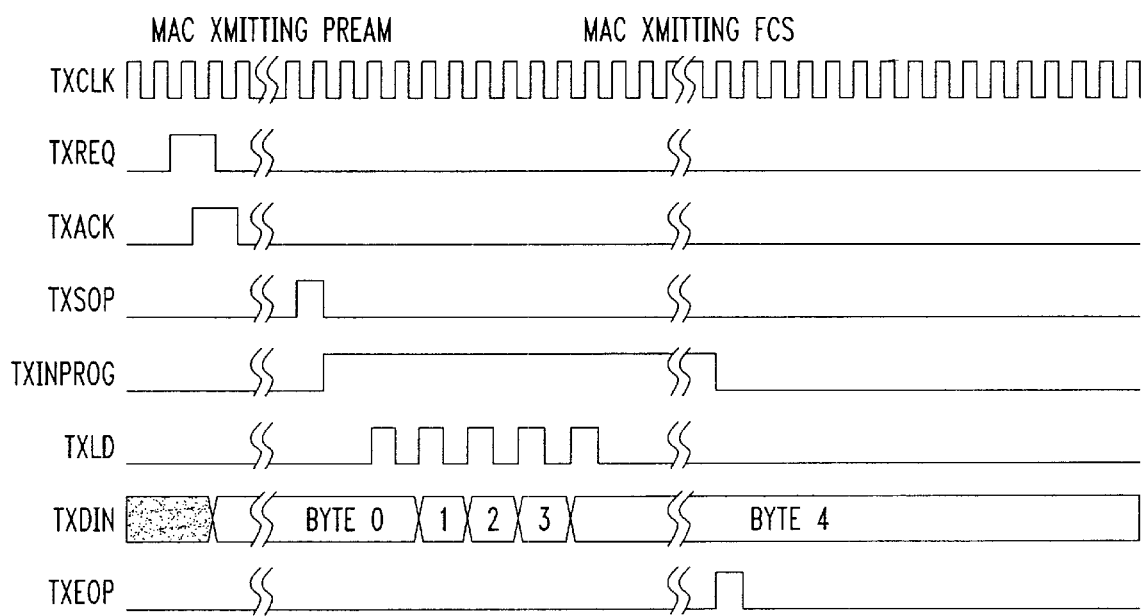
FIG. 11 is a transmit synchronous data delay timing diagram.

FIG. 11 is a timing diagram for TXS 440 at the MAC interface for a five-byte frame with no padding (where bytes are greater than 60 bits). Preferably, the TXCLK transmits at a maximum 25 MHz frequency. The TXREQ signal requests a packet transmission and is a handshake signal. TXREQ is held high until TXACK is activated by the MAC and is not reactivated until the signal TXEOP is returned by the MAC. TXACK is used in conjunction with TXREQ as a handshake. When TXACK goes high in response to TXREQ (which is asserted by TXS 440 to initiate transmission), TXREQ can be deactivated. TXACK is active for one TXCLK cycle. TXS 440 then clears TXREQ and begins transmitting data upon reception of TXACK.

The TXSOP signal is used to indicate the start of transmission of a packet. It is active for one cycle at the start of MAC transmission of the preamble. TXSOP is valid on the positive edge of TXCLK. TXINPROG is the signal that indicates that a transmission is in progress; it is set high if the MAC is currently transmitting preamble, data, or CRC. TXINPROG is not active if jamming occurs or during collision backoff. TXS 440 uses TXINPROG to indicate the end of collision backoff.

TXLD is a transmit load data signal that informs TXS 440 that the MAC requires a byte of data for transmission. TXDIN will be strobed by the MAC on the cycle following TXLD and is valid on the positive edge of TXCLK. TXDIN is utilized by the transmit data bus and is a single octet of transmit data which is sent to the MAC. The next octet of data is written onto the bus on the cycle following assertion of TXLD from the MAC. The TXEOP signal is the end-of-packet signal that is used to indicate the end of a transmit operation by the MAC. The operation ends because of a successful transmission, excessive collisions, excess deferral, or an ABORT command. TXEOP is active for one TXCLK cycle and is used by TXS 440 to place the state machine into the wait_for start. TXEOP is valid on a positive edge of TXCLK.

Figure 12:
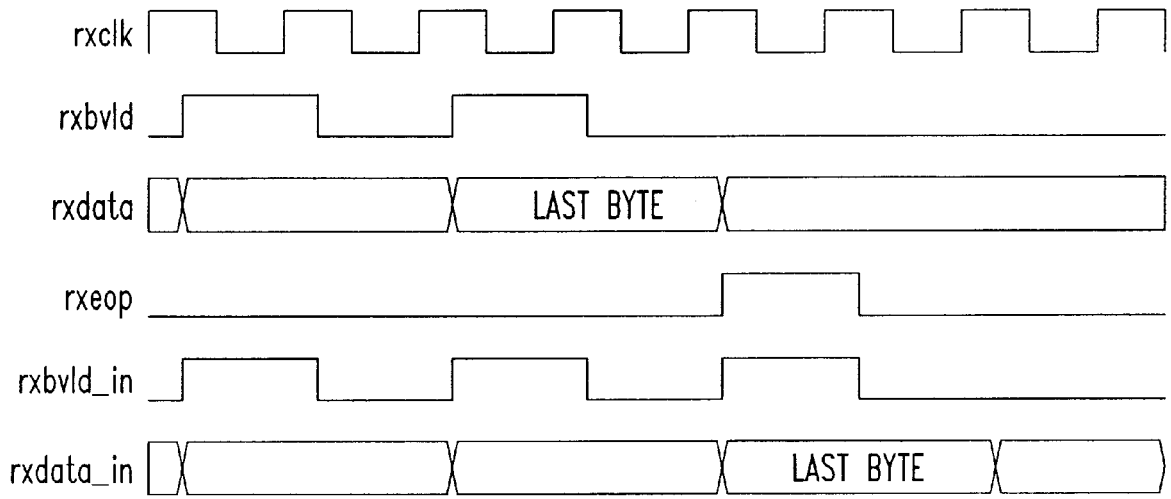
FIG. 12 is a receive synchronous data delay timing diagram in the normal mode.
Figure 13:
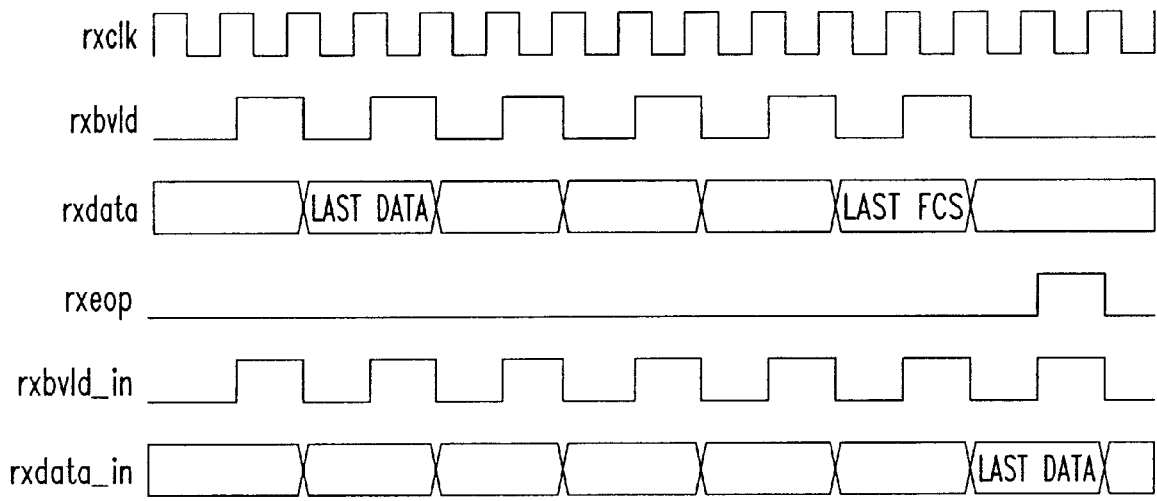
FIG. 13 is a receive synchronous data delay timing diagram in the stripCRC mode.

FIGS. 12 and 13 depict timing diagrams of the signals in RXS 430 for the normal mode and stripCRC mode, respectfully. The MAC receive clock signal, RXCLK, is preferably set at 25 MHz maximum. When a receive byte valid control signal (rxbvld) is high, the data on the receive byte (rxbyte) line is considered to be valid frame data. In normal mode (FIG. 12), the receive data (rxdata) signal triggers the last byte of data on the negative edge of RXCLK and the positive edge of rxblvd. In stripCRC mode, rxdata octets stream through RXS 430 continuously. The receive end-of-packet signal (rxeop) indicates that the current octet on the rxbyte line is the last octet in the Ethernet frame. In normal mode, the input rxbvld (rxbvld in) and the rxdata stream are in four octets, while in stripCRC mode they stream in eight octets.

The integrated circuits of the present invention thus efficiently and economically implement multichannel media access control devices for controlling data transmission through networks. The transmit and receive FIFOs on the transmit and host sides of the integrated circuits, respectively, are deeply embedded in the circuit which helps to maximize the throughput efficiency of the circuit. The FIFOs each have embedded data memories that are adapted to receive data from all of the MAC channels, thereby greatly reducing the area of the integrated circuit. This shared memory architecture requires that the data be scheduled for transmission from the host and retimed. The scheduling and retiming performed in accordance with the invention greatly improves the access time to internal RAM devices of the circuits as compared to prior art multichannel MAC devices and improves data transmission efficiency. These results have not heretofore been achieved in the art.

While there has been shown and described certain fundamental novel features of the present invention as applied to a preferred embodiment thereof, it will be understood by those skilled in the art that various omissions and substitutions and changes in the methods and devices described herein, and in their operation, may be made by those skilled in the art without departing from the spirit and scope of the invention. It is expressly intended that all combinations of those elements and/or method steps would perform substantially the same function and substantially the same way to achieve the same results are within the scope of the invention. Substitutions of elements from one described embodiment to another are also fully intended and contemplated. It is the intention, therefore, to be limited only as indicated by the scope of the claims appended hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention.

Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We I claim:

1. An integrated circuit, comprising:
    a plurality of media access control circuits capable of transmitting and receiving multiple channels of data according to a timing sequence established by a clock domain for each of the media access control circuits;
    a shared memory element for receiving channel data from and for storing data received from said plurality of media access control circuits associated with at least two channels; and
    a multichannel controller for scheduling when the channel data can be stored in the shared memory element and for retiming the channel data from the clock domain of each of the media access control circuits to a common host clock domain.

2. The integrated circuit of claim 1, further comprising a FIFO circuit in which the shared memory element is deeply embedded for storing and communicating channel data from the multiple channels to a host.

3. The integrated circuit of claim 2, wherein each of the channels comprises a synchronization circuit for retiming the channel data from the clock domains of the media access control devices to the host clock domain in accordance with commands output by the multichannel controller.

4. The integrated circuit of claim 3, wherein said synchronization circuit is a transmit synchronization circuit comprising a plurality of logic elements for presenting data to the media access control circuits in single octets and for retiming the data to the host clock domain.

5. The integrated circuit of claim 4, wherein said transmit synchronization circuit comprises:
    a reset synchronous logic block for resynchronizing a rising edge of a negative-active reset signal input to the transmit synchronization circuit so that all logic elements in the transmit synchronization circuit come out of reset on a same cycle of the host clock domain;
    an address control logic block in logical communication with the reset synchronous logic block for operating on configuration bits for the data to set addresses for the data;
    a main state machine in logical communication with the address control logic block for controlling logical flow of frames of data through the integrated circuit; and a flow control generator block in communication with the media access control circuits for producing a control signal for controlling when a frame of data should be transmitted from one of the media access control circuits to the transmit synchronization circuit.

6. The integrated circuit of claim 5, further comprising a receive synchronization circuit comprising a plurality of logic elements for retiming data received by the media access control circuits from the media access control circuits clock domain to the host clock domain and for assembling octets of data received from the media access control circuits into 64-bit words for storage in the FIFO circuit.

7. The integrated circuit of claim 6, wherein said FIFO circuit comprises:

a scheduler block for scheduling receipt of data octets output from the media access control circuits by building a queue of flag data that controls when the data octets received from the plurality of media access control circuits can be buffered;

a data memory for storing the data octets and addresses for the data octets in response to the scheduling of the data octets by the scheduling block;

a write state machine in logical communication with the scheduler block for controlling when the data octet addresses can be written to the data memory in response to the scheduling of the data octets created by the scheduler block;

a request logic block in communication with the data memory for determining whether the data memory contains enough data to allow a read request from a host to be made of the data memory; and a read state machine in communication with the data memory for processing read commands from the host so that the data memory can be read by the host.

8. A method of controlling data communication in a network, comprising the steps of:

reading multiple channels of data produced according to individual timing sequences of a plurality of media access control devices;

retiming the multiple channels of data from the individual timing sequences of the plurality of media access control devices to a common timing sequence;

scheduling the multiple channels of data for storage in a data buffer to be read by a host on the network;

storing the data in the data buffer; and outputting the multiple channels of stored data from the data buffer in response to a host command in the retimed sequence.

9. The method of claim 8, wherein said scheduling step comprises building a queue of flag data for each of the channels to control when data octets for the channels can be input to a data buffer.

10. The method of claim 9, wherein said outputting step comprises receiving a command from a host to read the data octets in the data buffer in accordance with the scheduled data that has been queued.

11. The method of claim 10, wherein all of the data octets for all of the channels are stored in a single data buffer.

* * * * *